United States Patent Office

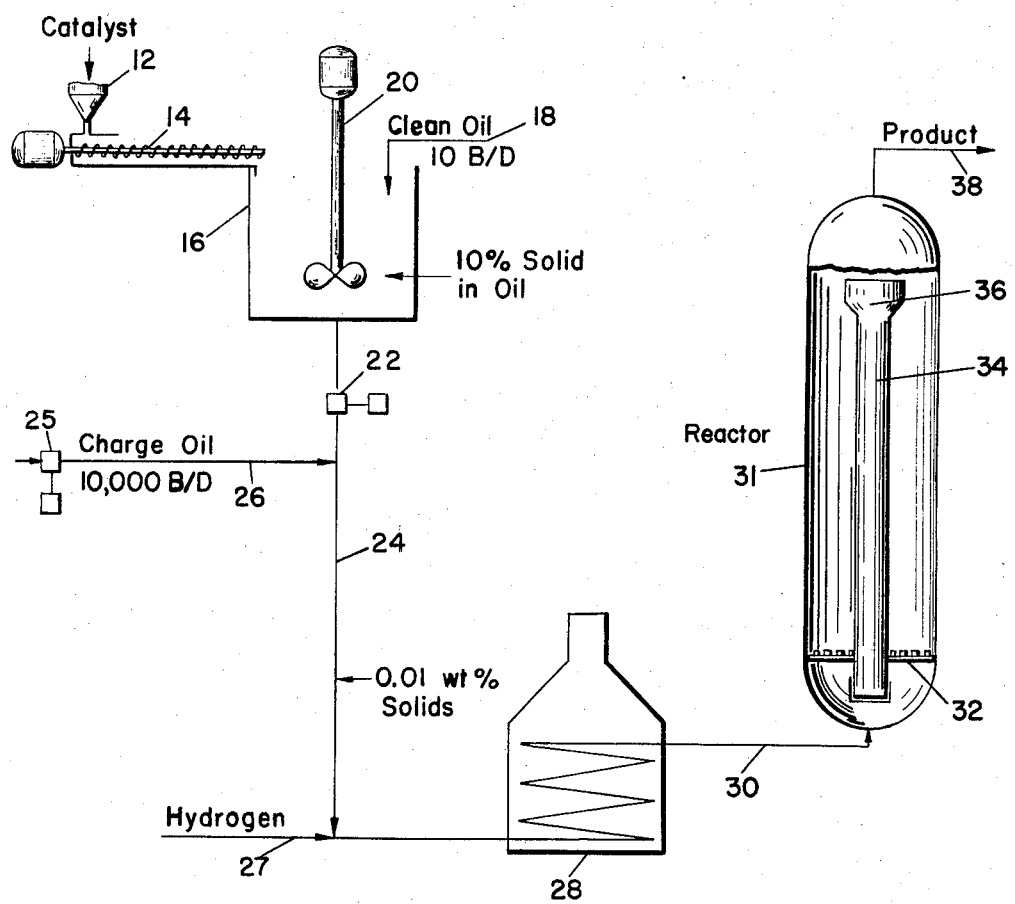

3,368,965
Patented Feb. 13, 1968

3,368,965
TWO STAGE SLURRYING
Seymour C. Schuman, Princeton, N.J., assignor to Hydrocarbon Research, Inc., New York, N.Y., a corporation of New Jersey
Continuation-in-part of application Ser. No. 277,283, May 1, 1963. This application Aug. 4, 1965, Ser. No. 480,241
3 Claims. (Cl. 208—143)

ABSTRACT OF THE DISCLOSURE

Pretreatment of hydrogenation catalyst by wetting with a clean oil having lower Ramsbottom carbon residue, low inorganic content and low aromaticity prior to slurrying with the feed oil to prevent excessive catalyst poisoning from the initial contact with the feed.

---

This application is a continuation-in-part of my copending application Ser. No. 277,283, filed May 1, 1963, now abandoned.

This invention relates to improvements in the hydrogenation of hydrocarbon oils and is more particularly directed to an improvement in the ultimate activity of finely sized contact particles as, for example, catalyst, by carefully controlling their method of introduction into the feed oil.

In the hydrogenation of hydrocarbon oils and particularly of heavy oils containing over 10% of material boiling above 975° F., it may be necessary to continuously or semicontinuously feed relatively fine-sized catalyst into the reaction system to maintain the activity of the bed of contact particles contained in the reactor to accomplish the desired catalytic reactions. This is particularly true using catalysts such as cobalt molybdate deposited on alumina to hydrogenate heavy oils since the fresh catalyst is extremely active and easily poisoned due to carbon formation, deposition of metals and the like.

My invention is based on the formation of a preliminary slurry mixture of catalyst and a clean oil which is defined as a non-aromatic oil of low coking tendency and which contains a minimum of materials which might prove deleterious to the catalyst, such as inorganic impurities. This oil-catalyst slurry is then contacted with the feed stock which normally contains these harmful components. The function of the clean oil is to prevent the highly active catalyst from being rapidly poisoned by the initial reaction of the feed stock on its highly active surface. Since the active catalytic surface is initially wetted with the clean oil, the reactions initially occurring at hydrogenation conditions will produce minimum deterioration of the active surface.

Further objects and advantages of my invention will appear from the following description of a preferred form of embodiment of the invention and as more particularly shown in the attached drawing the figure of which is a schematic flow diagram of the component parts of a two stage slurry system.

In the hydrogenation (hydrodesulfurization, hydrocracking, saturation) of such normally liquid hydrocarbon oils, the feed is reacted with hydrogen and catalyst in a suitable reactor which usually operates under temperatures in the order of 600° to 900° F. and under pressures of 500 p.s.i.g. to 5000 p.s.i.g. The catalyst used in such a system is often less than 300 micron size and the protection of this catalyst from rapid deactivation is accomplished in accordance with the following two stage operation.

The catalyst as indicated in the hopper at 12 is discharged by a metering device 14 such as a screw feeder into a preliminary clean oil tank 16 to which oil is introduced at 18. It is essential that the oil be a "clean" as distinct from "poisonous" or "reactive" oil as the only object of this oil is to form the desired mixture to protect the catalyst. Various types of clean oil are available and a typical clean oil is a lubricating oil fraction of any suitable viscosity. This oil and catalyst is then mixed by a typical mixer 20 to produce a concentrated slurry which will have in the order of 10% solids in the oil. For an ultimate operation of 10,000 barrels per day at catalyst deactivation rates usually encountered, the amount of clean oil will only amount to the order of 10 barrels per day.

This concentrated slurry is then pumped at 22 into the feed line 24 to which the charge oil is introduced under pressure of pump 25 through line 26. Under normal circumstances, no separate or unusual mixing device is required for the mixing of the oil with the concentrated slurry for it is found that a reasonably short length of pipe will immediately develop a dilution of the already wetted slurry to the desired concentration even though of less than one one thousandth of the prior concentration. The oil-slurry together with hydrogen in line 27 then passes through a heater 28 and thence by line 30 into the reactor 31.

The reactor 31 may be of a once-through type or provided with either an internal or external circulating system. As shown, the oil-slurry passes up through liquid distributor member 32, preferably a bubble cap type deck, by which the catalyst and oil and hydrogen are distributed through the reaction zone. With an internal reactor tube 34 such as shown, there is a flow of liquid into the top 36 of the tube 34 and out through the bottom below the distributor member 32 due to the difference in gravity between the substantially gas free liquid in the downcomer 34 and the gas containing liquid column external of the downcomer 34. A pump may be used at the bottom of the internal reactor tube 34 to assure positive circulation. However, normally, in a commercial size reactor there is sufficient back mixing to maintain the desired minimum temperature differential. Product is removed at 38 from the top or at least the upper part of the reactor 31.

While the precise theory of operation of my invention is not completely understood, it appears that when the fresh catalyst is first wetted or coated by the clean oil molecules, it can then be heated along with regular heavy charge oil and hydrogen without forming much coke on its surface. This results in a more active catalyst reaching the reactor. The most important result of this procedure is that all the catalyst in the reactor is then of higher activity than if it were added by just mixing it with the feed without taking the aforementioned precautions, or alternatively, that less make-up catalyst is required to maintain a given catalytic activity.

The following example is presented to describe the advantages of this system:

*Example*

A plant charging 10,000 bbl./day of Kuwait residuum having the following inspections:

| | |
|---|---|
| Gravity, ° API | 7.2 |
| Sulfur, w. percent ($H_2S$ Free) | 5.21 |
| RCR, w. percent | 16.67 |
| Vol. percent at 975° F. | 18 | and operating at the following conditions:

| | |
|---|---|
| Pressure, p.s.i.g. | 2700 |
| Temperature, ° F. | 840 |
| Fresh feed space vel., v./hr./v. | 1.0 |
| $H_2$ Rate, s.c.f./bbl. | 6000 |
| Catalyst addition rate, w. percent on charge | 0.040 | yields 10,490 bbl./day of total liquid products having the following properties:

| | |
|---|---|
| Gravity, ° API | 21.2 |
| Vol. percent at 600° F. | 27 |
| Sulfur w. percent (H₂S Free) | 1.83 |

By changing the method of catalyst addition to include presoaking in a SAE 30 lubricating oil fraction of a Ramsbottom carbon value of 0.42% it is possible to reduce the amount of catalyst added to 0.028 wt. percent on charge. The reduction corresponds to a lowering of annual catalyst requirements for the 10,000 bbl./day plant from 500,000 lbs. per year to 350,000 lbs. per year with a consequent savings of 150,000 lbs. per year of catalyst which may cost of the order of $1 per pound.

As previously indicated, petroleum lubricating oil fractions boiling above about 700° F. are the preferred clean oils for this invention. These fractions may have a viscosity between SAE 5 and SAE 250 at a temperature of 210° F., and may be pretreated in various ways such as by prior extraction using propane, furfural, or methyl ethyl ketone to remove undesirable components such as insolube materials, organo-metallic compounds and polynuclear aromatic compounds. They may be further clay-treated, distilled or even hydrogen refined before use. Actually, any such clean oil having less insoluble materials or organo-metallic compounds or polynuclear aromatic compounds than the heavy oils to be hydrogenated may be advantageously used as described above. However, since the amount of clean oil which must be used is very small and not costly, it is advantageous to utilize the best available oil to obtain the largest reduction in catalyst utilization rates and cost. Thus, whereas clean oils which provide a Ramsbottom carbon value below 5.0 wt. percent (as measured by ASTM test D-524, American Standards on Petroleum Products and Lubricants) are effective for my invention to some degree, I prefer oils which provide a Ramsbottom carbon value below 0.5 wt. percent. The viscosity of this oil may be over a wide range sufficient to permit suspension of the catalyst; again, since only small amounts of oil are used, a commonly available fraction such as that possessing a viscosity of the order of SAE 30 at 210° F. may be readily utilized. Boiling range and other properties are of minimal or negligible importance as far as can be determined at this time.

While I have shown and described a preferred form of embodiment of my invention, I am aware that modifications may be made thereto within the scope and spirit of the description herein and of the claims appended hereinafter.

I claim:

1. In a process for the hydrogenation of a heavy hydrocarbon feed oil containing at least 10% of material boiling above 975° F. by passing said feed oil and a hydrogen rich gas through a reaction zone under temperature conditions in the range of 600° F. and 900° F. and under pressure conditions in the range of 500 p.s.i.g. and 5000 p.s.i.g. in the presence of a hydrogenation catalyst the predominant part of which is of a particle size less than 300 micron to react said feed oil with said hydrogen rich gas, the improvement which comprises first wetting said catalyst with a clean oil of less Ramsbottom carbon residue, lower inorganic impurities, and of less aromaticity than the feed oil to form a slurry containing about ten (10) wt. percent solids in the clean oil, thereafter contacting said wetted catalyst with feed oil to form a pumpable slurry having in the order of 0.01 wt. percent solids in the feed oil and introducing said pumpable slurry into the reaction zone.

2. In a process for the hydrogenation of a heavy hydrocarbon feed oil as claimed in claim 1, the further step of utilizing a lubricating oil fraction as the clean oil.

3. In a process for the hydrogenation of a heavy hydrocarbon feed oil as claimed in claim 1 wherein the feed oil is a residuum-containing hydrocarbon oil, the catalyst is cobalt molybdate, the clean oil is a lubricating oil, the pumpable slurry is passed into the reaction zone with upflow of feed oil and catalyst through the reaction zone under temperature, pressure and time conditions to substantially desulfurize the oil, and an effluent is removed from an upper part of the reaction zone.

References Cited

UNITED STATES PATENTS

| | | | |
|---|---|---|---|
| 2,987,465 | 6/1961 | Johanson | 208—112 |
| 2,987,468 | 6/1961 | Chervenak | 208—97 |
| 2,987,470 | 6/1961 | Turken | 208—89 |
| 3,151,060 | 9/1964 | Garbo | 208—143 |
| 3,183,180 | 5/1965 | Schuman et al. | 208—143 |

SAMUEL P. JONES, *Primary Examiner.*

DELBERT E. GANTZ, *Examiner.*